United States Patent
Urquhart et al.

(10) Patent No.: US 10,965,756 B2
(45) Date of Patent: Mar. 30, 2021

(54) SENSOR SYSTEM OF MASTER AND SLAVE SENSORS, AND METHOD THEREIN

(71) Applicant: TELEFONAKTIEBOLAGET LM ERICSSON (PUBL), Stockholm (SE)

(72) Inventors: Neil Urquhart, Trosa (SE); Athanasios Karapantelakis, Stockholm (SE); Keven Wang, Kista (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 347 days.

(21) Appl. No.: 15/511,466

(22) PCT Filed: Sep. 16, 2014

(86) PCT No.: PCT/SE2014/051071
§ 371 (c)(1),
(2) Date: Mar. 15, 2017

(87) PCT Pub. No.: WO2016/043635
PCT Pub. Date: Mar. 24, 2016

(65) Prior Publication Data
US 2017/0289255 A1   Oct. 5, 2017

(51) Int. Cl.
*H04L 29/08* (2006.01)
*H04L 12/26* (2006.01)
*H04L 29/12* (2006.01)

(52) U.S. Cl.
CPC ............ *H04L 67/12* (2013.01); *H04L 43/16* (2013.01); *H04L 43/065* (2013.01); *H04L 61/1511* (2013.01)

(58) Field of Classification Search
CPC ....... H04L 67/12; H04L 43/16; H04L 43/065; H04L 61/1511
See application file for complete search history.

(56) References Cited

U.S. PATENT DOCUMENTS 6,760,317 B1 * 7/2004 Honkanen ............. H04L 1/0001
370/329
7,676,522 B2 * 3/2010 Klein .................. H04L 41/5009
707/803

(Continued)

OTHER PUBLICATIONS

International Search Report and Witten Opinion dated Jun. 10, 2015 in International Application No. PCT/SE2014/051071, 10 pages.

(Continued)

*Primary Examiner* — Javier O Guzman
(74) *Attorney, Agent, or Firm* — Rothwell, Figg, Ernst & Manbeck, P.C.

(57) ABSTRACT

It is disclosed a sensor system (10, 58) and a method therefore for providing quality data to a network node. The sensor system comprises two or more populations (12*a*, 12*b*, 56*a*, 56*b*) of sensors, each population having a plurality (11*i*, 11*j*, 52*a*, 52*i*, 200) of single-purpose slave sensors distributed over a geographical area and at least one master sensor (14*a*, 14*b*, 54). Based on the data quality received (302) from each single-purpose slave sensor, a master sensor may perform discretionary management (320, 322) and terminate (322) single-purpose slave sensor not meeting data quality standards. The sensor system provides a possibility to deploy master sensors and single-purpose slave sensor networks in remote or inaccessible areas without large network planning expenditures, for example by "carpet-bombing" an area with slave sensors and master sensors from the air.

16 Claims, 7 Drawing Sheets

(56) References Cited

U.S. PATENT DOCUMENTS

| | | | |
|---|---|---|---|
| 9,872,219 B2* | 1/2018 | Miller-Smith | H04W 36/30 |
| 9,883,322 B2* | 1/2018 | Desclos | H04W 48/18 |
| 2003/0184468 A1* | 10/2003 | Chen | G06K 9/3241 |
| | | | 342/52 |
| 2004/0153708 A1* | 8/2004 | Joshi | G06F 9/5088 |
| | | | 714/47.2 |
| 2004/0199368 A1* | 10/2004 | Bechhoefer | G01H 1/003 |
| | | | 703/7 |
| 2005/0152329 A1 | 7/2005 | Krishnan et al. | |
| 2006/0013172 A1 | 1/2006 | Ruuska et al. | |
| 2006/0224048 A1* | 10/2006 | Devaul | A61B 5/0024 |
| | | | 600/300 |
| 2006/0224357 A1* | 10/2006 | Taware | G05B 9/02 |
| | | | 702/179 |
| 2007/0139220 A1* | 6/2007 | Mirza | G01D 4/004 |
| | | | 340/870.02 |
| 2007/0159321 A1* | 7/2007 | Ogata | A61B 5/0002 |
| | | | 340/539.12 |
| 2008/0115114 A1 | 5/2008 | Claus et al. | |
| 2008/0208367 A1* | 8/2008 | Koehler | G01D 3/08 |
| | | | 700/19 |
| 2009/0002148 A1* | 1/2009 | Horvitz | G06Q 10/047 |
| | | | 340/514 |
| 2010/0029265 A1 | 2/2010 | Myer et al. | |
| 2010/0029268 A1* | 2/2010 | Myer | F21S 2/00 |
| | | | 455/426.1 |
| 2010/0065728 A1* | 3/2010 | Choi | H04W 84/18 |
| | | | 250/252.1 |
| 2010/0293131 A1 | 11/2010 | Qi et al. | |
| 2012/0116696 A1* | 5/2012 | Wank | G01R 31/42 |
| | | | 702/58 |
| 2012/0197898 A1* | 8/2012 | Pandey | G06F 16/2264 |
| | | | 707/741 |
| 2012/0310599 A1* | 12/2012 | Tanaka | A01B 79/005 |
| | | | 702/189 |
| 2013/0124763 A1* | 5/2013 | Kessler | G06F 13/4295 |
| | | | 710/110 |
| 2013/0237775 A1 | 9/2013 | Gross | |
| 2014/0067900 A1* | 3/2014 | Fukumura | H04L 65/4069 |
| | | | 709/201 |
| 2014/0275849 A1* | 9/2014 | Acquista | A61B 5/0022 |
| | | | 600/301 |
| 2014/0341073 A1* | 11/2014 | Abraham | H04W 48/18 |
| | | | 370/254 |

OTHER PUBLICATIONS

European Search Report issued in Application No. 14901943.2 dated Jul. 20, 2017, 4 pages.
European Office Action issued in Application No. 14901943.2 dated Aug. 11, 2017, 5 pages.

* cited by examiner

SENSOR SYSTEM OF MASTER AND SLAVE SENSORS, AND METHOD THEREIN

CROSS REFERENCE TO RELATED APPLICATION

This application is a 35 U.S.C. § 371 National Stage of International Application No. PCT/SE2014/051071, filed Sep. 16, 2014, designating the United States, the disclosure of which is incorporated by reference.

TECHNICAL FIELD

This disclosure relates to providing quality data to a network node by a sensor system. In particular it relates to providing quality data from two or more populations of sensors, where each population comprises a plurality of single-purpose slave sensors distributed over a geographical area and at least one master sensor.

BACKGROUND

Current techniques for sensor-based measurement and monitoring systems have large operational costs. These require end-less support maintaining the system, in the form of, for example, sensor repair, replacement, and de-activation. In these sensor-based networks, individual sensors are regarded as vital parts of each network.

Operational costs grow to unsustainable levels when sensor systems, in which individual sensors are regarded as vital parts, are scaled to thousands of sensors. Tracking faults to individual sensors accentuates the problem and drives up maintenance costs.

There is a need for a sensor system capable of providing high quality data and where each sensor is not regarded as a vital part of the sensor system.

SUMMARY

It is an object of embodiments of the invention to address at least some of the issues outlined above, and this object and others are achieved by a sensor system and a method therein, according to the appended independent claims, and by the embodiments according to the dependent claims.

According to a first aspect, this disclosure provides a method in a sensor system for providing quality data to a network node, wherein the sensor system comprises two of more populations of sensors, and each population comprises a plurality of single-purpose slave sensors distributed over a geographical area and at least one master sensor. The method comprises transmitting by at least a fraction of a plurality of single-purpose slave sensors, sensor data towards at least one master sensor. The method also comprises evaluating by the at least one master sensor, a data quality of sensor data of each single-purpose slave sensor from which sensor data is received. The method further comprises forwarding, by the at least one master sensor, to the network node at least a representation of the sensor data of each single-purpose slave sensor of which the data quality of the sensor data is higher than a data quality threshold. In addition, the method comprises sending by the at least one master sensor, a feedback message to each single-purpose slave sensor from which sensor data having a data quality lower than a data quality threshold is received, the feedback message being based on an updated reliability metric of said each single-purpose slave sensor.

According to a second aspect, this disclosure provides a sensor system capable of providing quality data to a network node. The sensor system comprises two or more populations of sensors, where each population comprises a plurality of single-purpose slave sensors distributed over a geographical area, and at least one master sensor. At least a fraction of the plurality of single-purpose slave sensors is adapted to transmit sensor data towards the at least one master sensor. The at least one master sensor is adapted to evaluate a data quality of sensor data of each single-purpose slave sensor from which sensor data is received and to forward to the network node at least a representation of the sensor data of each single-purpose slave sensor of which data quality is higher than a data quality threshold. The at least one master sensor is further adapted to send a feedback message to each single-purpose slave sensor from which sensor data having a data quality lower than a data quality threshold is received, where the feedback message is based on an updated reliability metric of said each single-purpose slave sensor.

The sensor system according to embodiments of this disclosure is resilient to faults in individual single-purpose slave sensors, as individual single-purpose slave sensors are not integral parts of the sensor system of embodiments of this disclosure. Rather, individual single-purpose slave sensors are merely disposable devices.

When deploying single-purpose slave sensors over a geographical area some sensors may fail due to being out of range in relation to neighbouring slave sensors or he master sensor. However, the plurality of single-purpose slave sensors, according to embodiments, is considered to compensate for such failures.

Embodiments of the sensor system also provides a possibility to deploy master sensors and single-purpose slave sensor networks in remote or inaccessible areas without large network planning expenditures, for example by "carpet-bombing" an area with slave sensors and master sensors from the air.

Another advantage is that maintenance costs/activities within a geographical area of distributed sensors are basically reduced to zero. When entire populations of sensors show too many failures, new sensors can be replenished in bulk.

Since the deployment and maintenance are inexpensive, scalability and deployment over large geographical areas such as farmlands, forests, seas, lakes, clouds, etc is enabled.

BRIEF DESCRIPTION OF THE DRAWINGS

Embodiments will now be described in more detail, and with reference to the accompanying drawings, in which.

DETAILED DESCRIPTION

In the following description, different embodiments of the invention will be described in more detail, with reference to accompanying drawings. For the purpose of explanation and not limitation, specific details are set forth, such as particular examples and techniques in order to provide a thorough understanding.

The sensor system as presented herein can be considered to be self-aware of its ability to provide quality data, and to decommission individual sensors or even itself, i.e. the complete sensor system.

"Quality data" whenever herein used shall be construed as data having an acceptable quality or a quality above a certain quality threshold.

The sensor system typically comprises two or more populations of sensor, where each population has one or more master sensors and a plurality of single-purpose slave sensors, which typically are inexpensive. By providing two or more populations of sensors, where each population has one or more master sensors, a redundancy of master sensors is provided.

The single-purpose slave sensors can form an ad-hoc sensor network and periodically transmit data towards the master sensor. The master sensor evaluates the data quality of the sensor data, may perform processing, such as computation and/or pre-filtering, and forwards the possibly processed sensor data towards a network node being its final destination.

Figure 1:
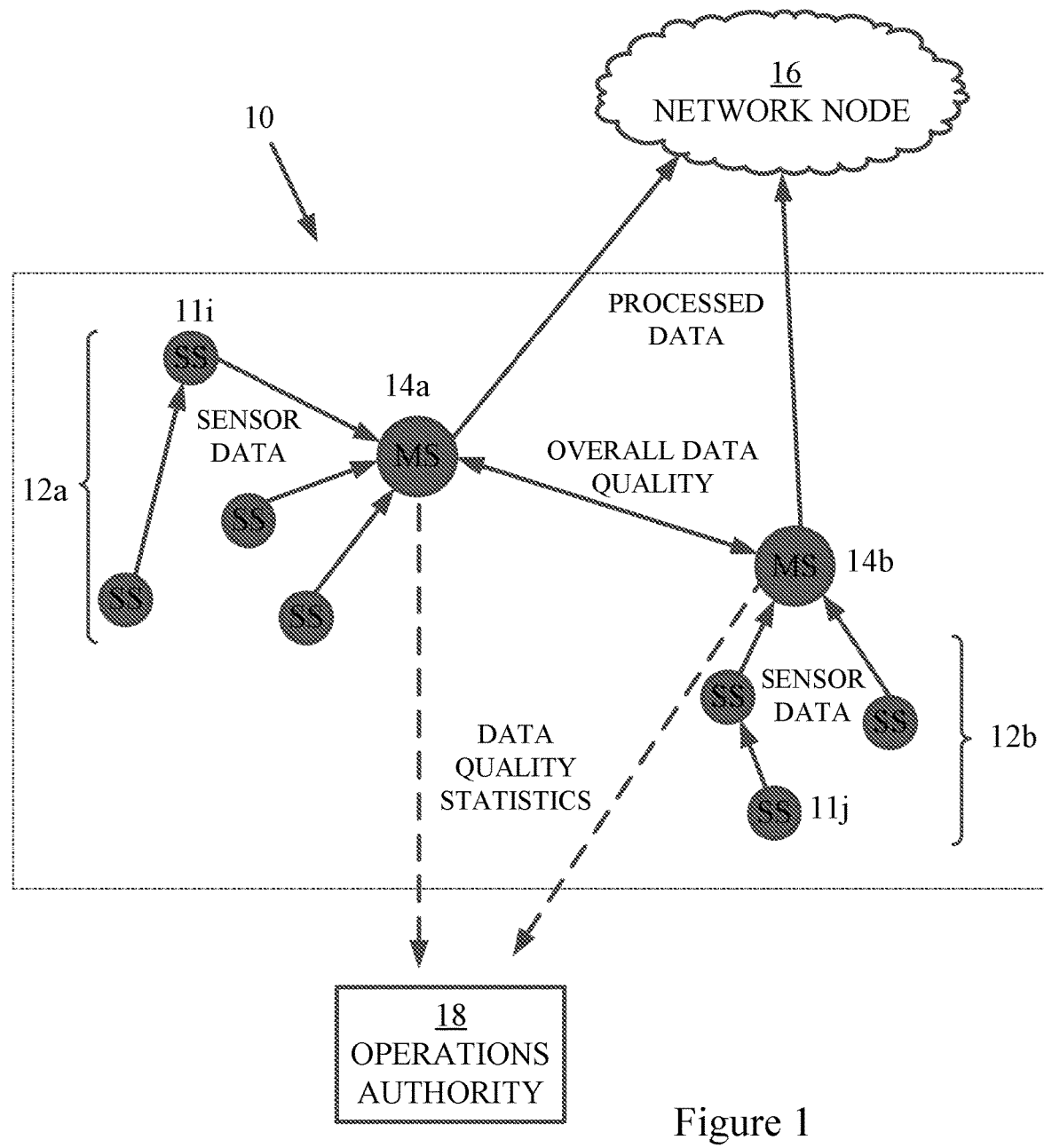
FIG. 1 illustrates a sensor system according to embodiments of this disclosure.

FIG. 1 presents a sensor system 10 according to embodiments of this disclosure. This sensor system 10 comprises a first population of sensors 12a, and a second population of sensors 12b. The first population has plurality of single-purpose slave sensors 11i, and a first master sensor 14a, where the second sensor population has a second plurality of single-purpose slave sensors 11j, and a second master sensor 14b. Each master sensor has computational capability and may perform discretionary management on single-purpose slave sensors. The master sensors function as gateways for the sensor data sent from the single-purpose slave sensors towards the respective network node. The single-purpose slave sensors can be inexpensive, and disposable, for instance, biodegradable.

Single-purpose slave sensors 11i, 11j transmit sensor data towards the respective master sensor 14a, 14b.

Sensor data may be transmitted by a single-purpose slave sensor to a broadcast address, or a unicast address depending on the configuration of the sensor system and the application domain, which will further be explained below.

Each respective master sensor can send a processed version of sensor data having a quality exceeding a data quality threshold to the network node 16.

In addition, master sensors transmit data quality statistics to operations authority 18.

Each master sensor may hence aggregate sensor data from a plurality of single-purpose slave sensors or local sets of single-purpose slave sensors, perform analysis and computation on the received sensor data and forward the processed data towards a network node, being its final destination.

Each master sensor evaluates the data quality of the received sensor data by actively monitoring the quality of the received sensor data. If the received sensor data from the same single-purpose slave sensor repeatedly or consistently fails to meet data quality standards, for instance by failing to meet a data quality threshold, the master sensor may mark this single-purpose slave sensor as defective and deactivates it. This may be performed by sending a message initiating the termination of a process of transmitting sensor data by the single-purpose. Upon receipt of this message, the single-purpose slave sensor terminates or deactivates itself, effectively hindering transmission of sensor data failing to meet a data quality standard.

Furthermore, master sensors may periodically generate an overall data quality metric for the plurality of single-purpose slave sensors in each respective population and exchange it with other overall data quality metrics from neighbouring populations of sensors. If this overall data quality consistently falls below a certain data quality threshold, then the master sensor can cease all data transmission towards the network node, thus effectively shutting down the population of sensors, or even a complete sensor system.

Master sensors support redundancy, as multiple master sensors may be in range or coverage of a plurality or a local set of single-purpose slave sensors. Master sensors can support such redundancy in two alternative ways:

Single-purpose slave sensors broadcast sensor data. In this case, master sensors in range have to decide which single-purpose slave sensor belongs to which master sensor, using some allocation method, for instance a signal to noise ratio, receives signal strength indication (RSSI), etc. Master sensors can exchange allocation information between them to make sure that single-purpose slave sensors are not allocated by multiple master sensors and thus to prevent that the same sensor data is taken is received and taken into account multiple times.

Single-purpose slave sensors unicast sensor data. In this case, single-purpose slave sensors can create a domain name server (DNS)-like record of the master sensors in range as part of an activation process within the each single-purpose slave sensor. This record consists of a list of prioritized addresses to the master sensors. If one master sensor, for instance does not acknowledge data reception, then a single-purpose slave sensor can choose a second master sensor next in the list. It is noted that in this case there is no need for allocation of single-purpose slave sensors by the master sensors. However, it brings an overhead on the single-purpose slave sensors, which need to store some DNS-like record data.

In addition, master sensors transmit data quality statistics to operations authority 18.

As mentioned above, master sensors may periodically transmit data quality statistics to operations authority, for example a team managing the sensor system's operation. The data quality statistics may include information about the overall data quality of the sensor system. Using these statistics the operation authority can perform maintenance of the sensor system on a population of sensors rather than on sensor granularity. If for instance, a master sensor of a population of sensors reports low data quality, the team could replenish new sensors by distributing or "sowing" said new sensors in the geographical area of interest in an attempt to upgrade the data quality of sensor data received by master sensors within the geographical area.

Once deployed, the singe-task slave sensors typically activate themselves and register to a nearby master sensor. Subsequently, said single-purpose slave sensors start transmitting sensor data towards this master sensor.

Figure 2A:
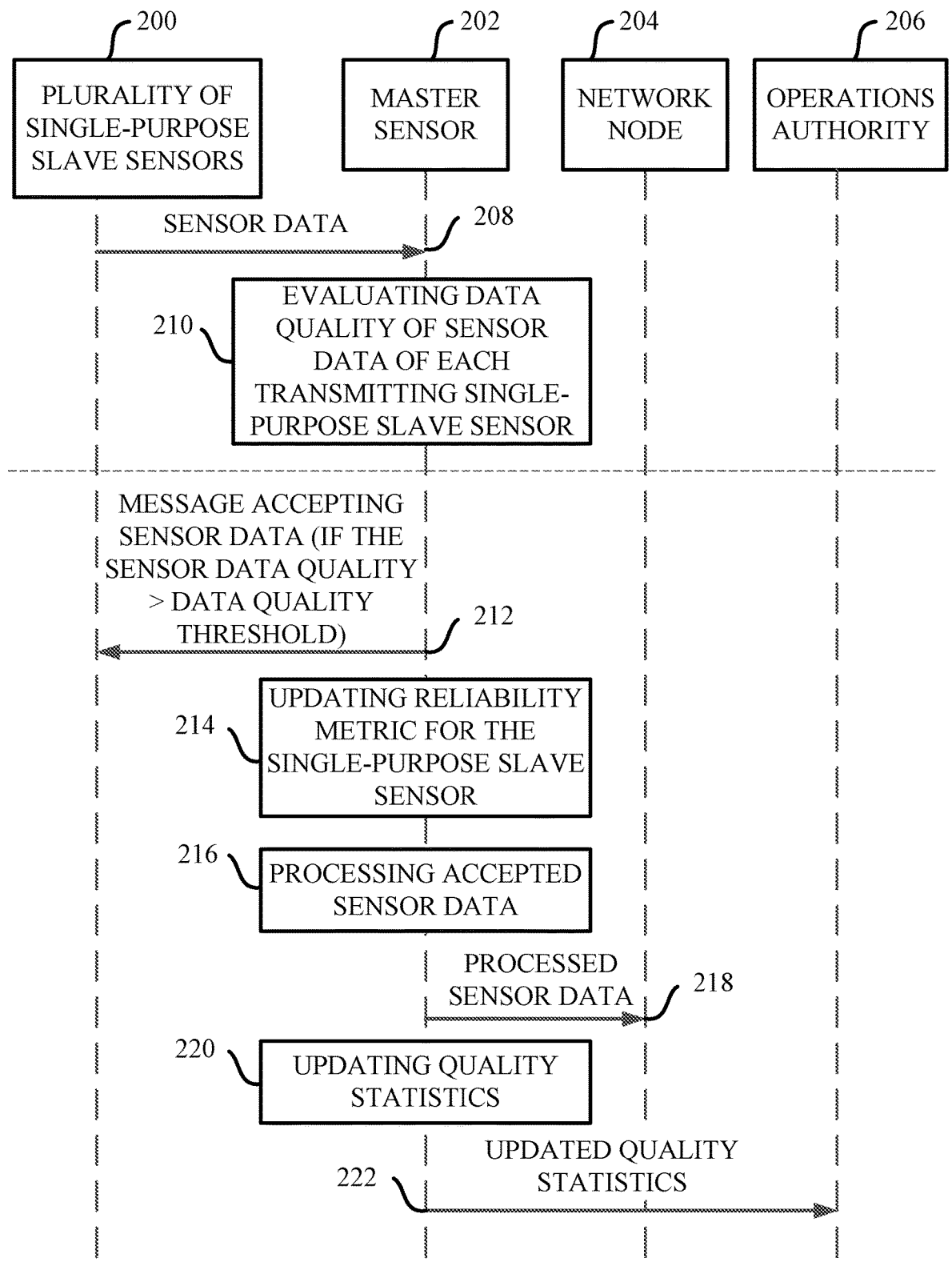
FIGS. 2A-C present hand-shake diagrams showing example steps, according to embodiments of this disclosure.
Figure 2B:
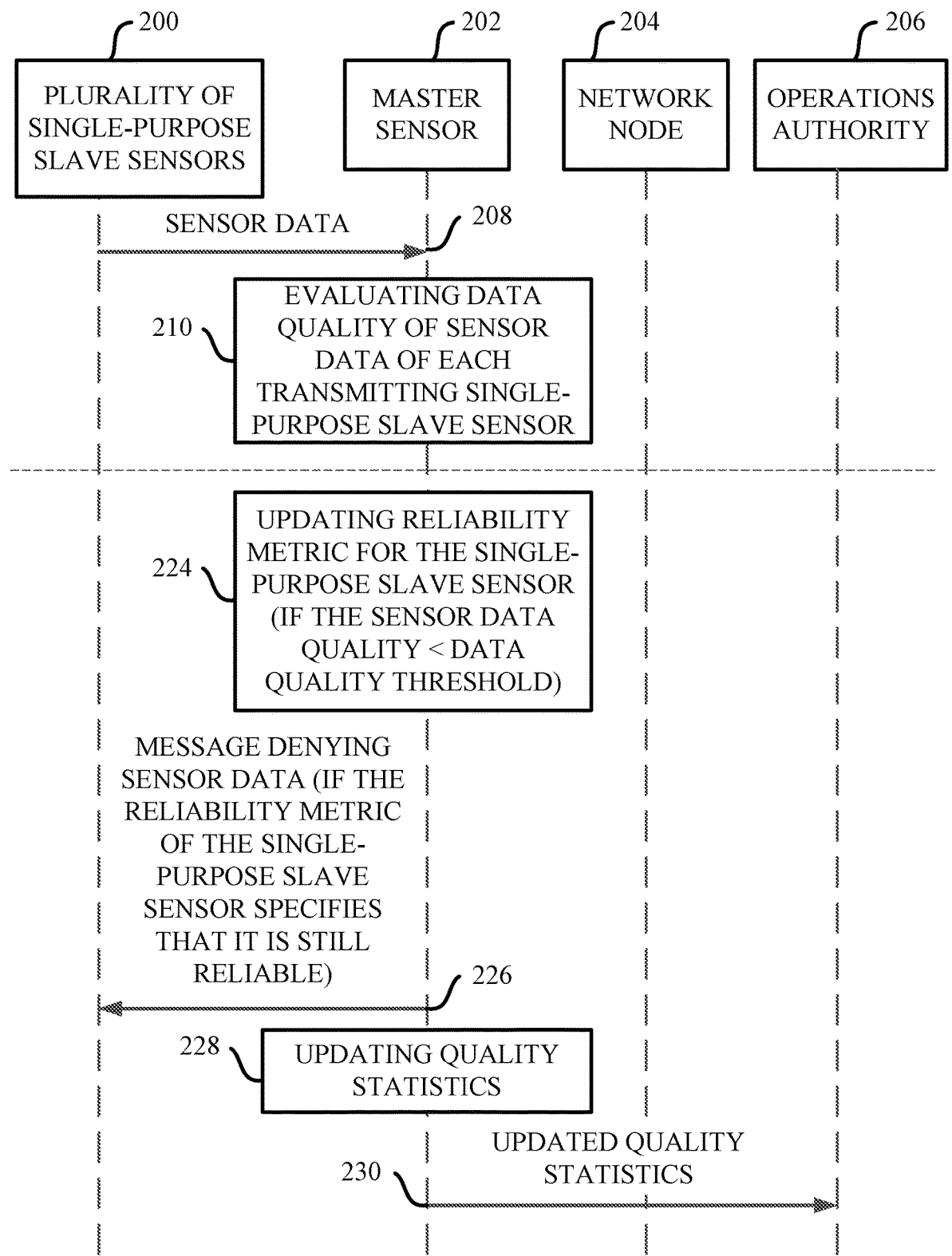
Figure 2C:
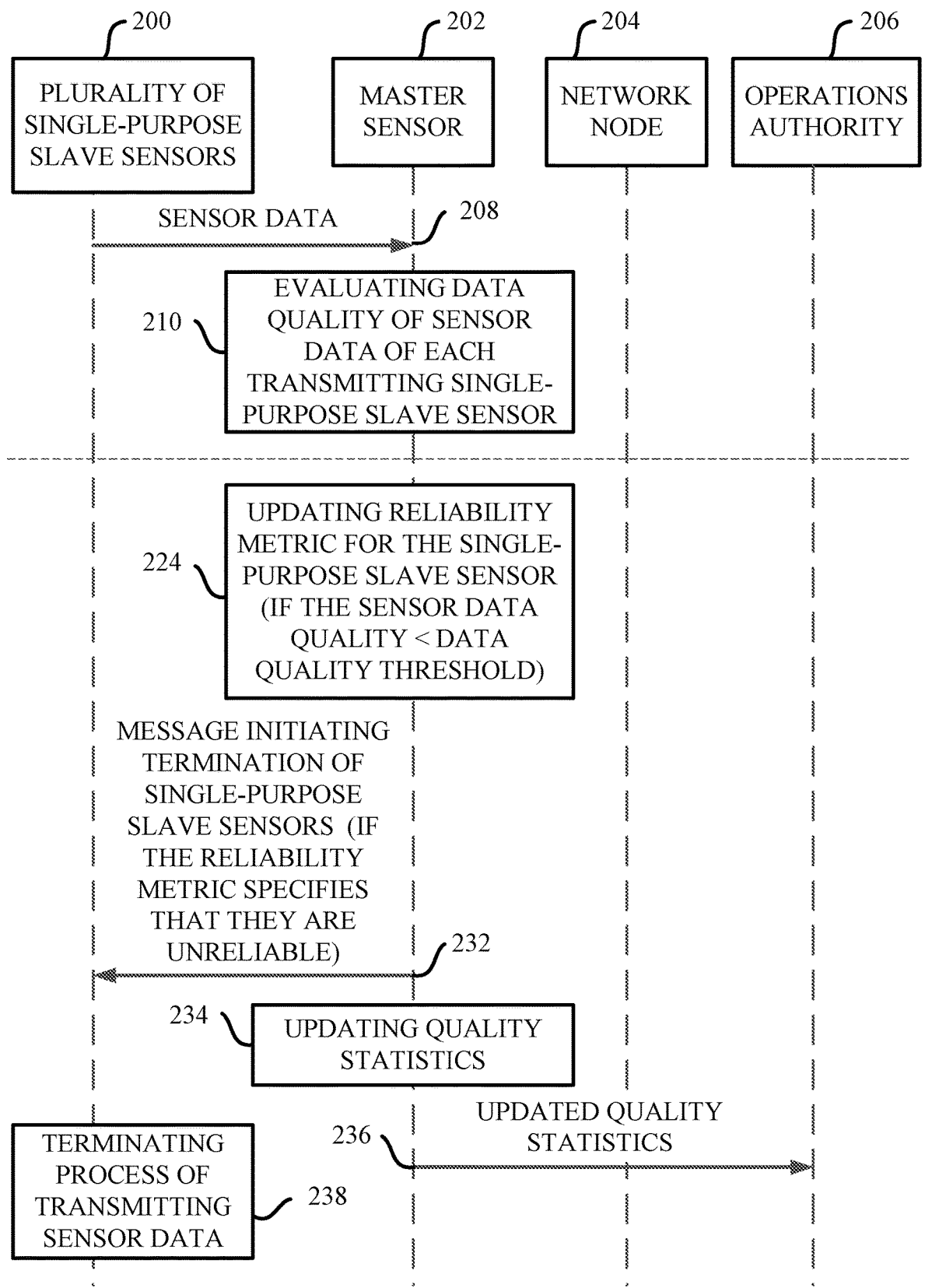

FIGS. 2A-2C illustrate hand-shake diagrams indicating a gateway function of master sensors, showing example steps, between a plurality of single-purpose slave sensors 200, a master sensor 202, a network node 204 and operations authority 206, according to embodiments of this disclosure.

It is mentioned that these hand-shake diagrams are simplified diagrams, in which for instance, acknowledgements have been omitted for reasons of clarity. It should thus be understood that acknowledgements, for instance, can be considered to be comprised within the present disclosure.

In 208, the plurality of single-purpose slave sensors 200 transmits sensor data towards the master sensor 202. This may be performed periodically. The actual number of single-purpose slave sensors distributed in a geographical area, may be larger than said plurality of singe-task slave sensors.

However, the plurality of single-purpose slave sensors 200 here denotes singe-task slave sensors within coverage of the master sensor 202. Also, a single-purpose slave sensor may send its sensor data directly to the master sensor, or alternatively to send it to another single-purpose slave sensor that relays the sensor data towards the master sensor 202.

In 210, the master sensor 202 having received the transmitted sensor data, evaluates the data quality of the sensor data of each single-purpose slave sensor that in effect transmits sensor data towards the master sensor 202. At least of fraction of the plurality of single-purpose slave sensors 200 transmits sensor data towards the master sensor 202. However, even the fraction of said plurality of single-purpose slave sensors 200 is typically a number being much larger than a few. Since a relatively large number of single-purpose slave sensors transmits sensor, the importance and contribution of each singular single-purpose slave sensor is reduced. By providing single-purpose slave sensor that are inexpensive, new single-purpose slave sensors may be replenished at a low cost when needed in order to establish for instance an improved data quality of received sensor data and/or improved distribution within a geographical area.

Among the sensor data transmitted by the single-purpose slave sensors, some sensor data may be evaluated to have a data quality that is higher than a data quality threshold. Also, sensor data transmitted from some other single-purpose slave sensors may be evaluated to have a data quality being lower than the data quality threshold.

Of a large number of single-purpose slave sensors, some single-purpose slave sensors may transmit sensor data having a quality exceeding a data quality threshold, whereas other single-purpose slave sensors may transmit sensor data having a quality failing to meet the same or another data quality threshold.

The master sensor may also check the sensor data integrity.

FIG. 2A illustrates a flowchart for singe-task slave sensor transmitting sensor data having data quality exceeding the data quality threshold.

In 212, a message accepting the sensor data will be sent to the single-purpose slave sensors of which the sensor data has a data quality higher that the data quality threshold.

In 214, the master sensor updates a reliability metric of each single-purpose slave sensor from which the sensor data having a data quality exceeding the data quality threshold is received. Updating of the reliability metric for a single-purpose slave sensor from which sensor data of a data quality exceeding a data quality threshold is received, may, in a basic example, be by setting the reliability metric to "1", meaning that this particular single-purpose slave sensor is regarded to be reliable by the master sensor.

The reliability metric may also be regarded as a data quality score of the particular single-purpose slave sensor.

Over time, as more sensor data from the single-purpose slave sensor is received, the data quality score of the worker sensor can be refined and becomes more accurate.

Note that the criteria used for calculation of the data quality score may depend on the application domain of the sensor system. For example, real-time applications such as fire detection in forests and earthquake warning systems may interpret data quality based on timely delivery, short periodicity of data packets as well as data accuracy. On the other hand, applications relying on historical data such as pollution monitoring may rate the sensor data based on completeness and consistency. Examples how to evaluate the data quality will be discussed further down.

It can be mentioned that master sensors may come preloaded with criteria used for data quality, as will be further described below. In addition, master sensors of sensor systems of embodiments of this disclosure have a preconfigured data quality acceptance threshold, against which the data quality of the received sensor data, as received from the single-purpose slave sensors, is compared.

Also, the master sensor keeps a history of the data quality of received sensor data, for instance as scores of received data packets, organized by source, i.e. single-purpose slave sensor.

In 216, the master sensor processes the accepted sensor data from the single-purpose slave sensor, thereby creating at least a representation of the sensor data that is accepted.

In 218, the master sensor transmits the processed sensor data to the network node 204, being a possible final destination of the sensor data.

In 220, the master sensor 202 may update quality statistics of said plurality of single-purpose slave sensors 200.

In 222, the master sensor 202 may transmit the updates quality statistics to an operations authority 206.

The master sensor here reports an updated change of the sensor system status to the operations authority 206. It is then up to the discretion of this authority on how to use the data provided.

It can be mentioned that updated of quality statistics is typically sent in any case, irrespective of the value of the reliability metric data quality.

FIGS. 2B and 2C illustrate flowcharts for singe-task slave sensors transmitting sensor data having data quality lower than the data quality threshold.

Steps 208 and 210 are however the same as the ones described in connection with FIG. 2A, for which reason reference to pertinent sections above is made.

In 224 of FIG. 2B, the master sensor updates a reliability metric of each single-purpose slave sensor from which the sensor data having a data quality being lower than the data quality threshold is received. Updating of the reliability metric for a single-purpose slave sensor from which sensor data of a data is lower than the data quality threshold is received, may in the basic example for instance be by reducing the reliability metric with "1", for instance reducing it from "1" to "0".

In 226, the master sensor sends a message denying sensor data to each single-purpose slave sensor having an updated reliability metric that specifies that it is still reliable, and from which sensor data having a data quality lower than the data quality threshold, is received.

In 228, the master sensor 202 may update quality statistics of said plurality of single-purpose slave sensors 200.

In 230, the master sensor 202 may transmit the updates quality statistics to an operations authority 206.

Turning to FIG. 2C illustrating another flow-chart for singe-task slave sensors transmitting sensor data having data quality lower than the data quality threshold. Again steps 208 and 210, correspond to the steps of FIGS. 2A and 2B. Also, step 224 is similar to the one of FIG. 2B.

However, now the master sensor updates a reliability metric of each single-purpose slave sensor from which the sensor data having a data quality being lower than the data quality threshold is repeatedly received. Updating of the reliability metric for a single-purpose slave sensor from which sensor data of a data again is lower than the data quality threshold, may in the basic example for instance be by reducing the reliability metric with "1", but now from for instance reducing it from "0" to "−1".

Thus if the data quality of the received sensor data is repeatedly lower than the data quality threshold, then the single-purpose slave sensor is considered to be unreliable.

Therefore, in 232 the master sensor sends a message initiating or a command termination, such as a command for termination, of each single-purpose slave sensor having an updated reliability metric specifying that it is unreliable, and from which sensor data having a data quality lower than the data quality threshold, is received.

In 234, the master sensor 202 may update quality statistics of said plurality of single-purpose slave sensors.

In 236, the master sensor 202 may transmit the updates quality statistics to an operations authority 206, in a way similar to what was described above.

In 238, single-purpose slave sensor of the plurality of single-purpose slave sensors, being unreliable and from which sensor data having a data quality lower than a data quality threshold is received, performs terminating their process of transmitting sensor data towards the master sensor 202.

Figure 3:
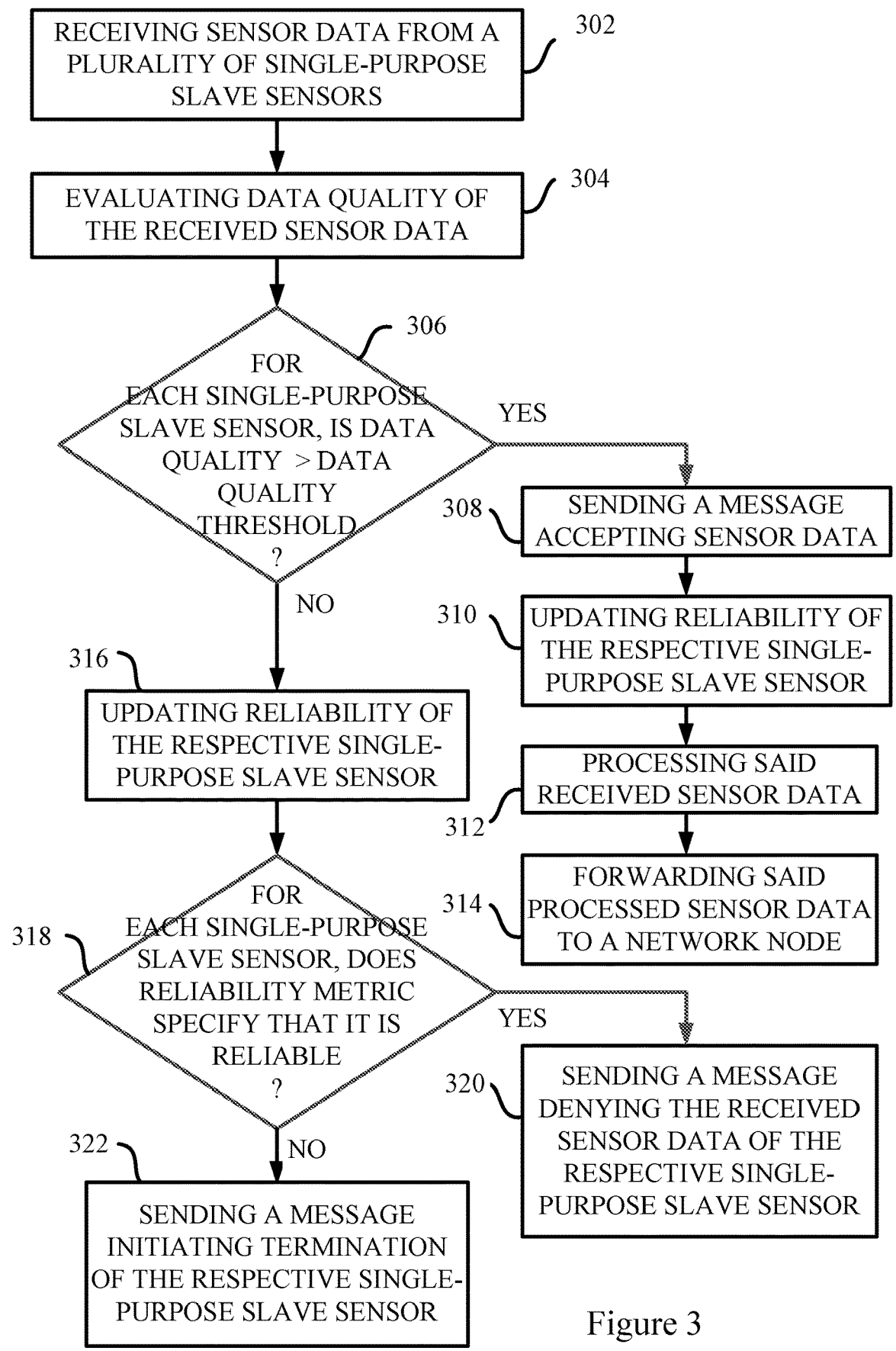
FIGS. 3 and 4 present flow-charts of methods according to embodiments of this disclosure.

FIG. 3 presents a flowchart of a sensor system according to embodiments of the present disclosure.

In 302, a master sensor performs receiving sensor data from a plurality of single-purpose slave sensors.

In 304, the master sensor performs evaluating data quality of the received sensor data. The data quality of may be performed by calculating the data quality of incoming data packets of the received sensor data.

The master sensors may be loaded with criteria for rating data quality prior to deployment. As mentioned above, the criteria may vary and depend on application and may be calculated using different methods.

Table 1 below illustrates some exemplifying criteria that may be used for the calculation of the data quality of the received sensor data.

TABLE 1

Example criteria for data quality evaluation.

| Criterion | Description | Calculation |
| --- | --- | --- |
| Timeliness | Is sensor data received on time? | Define a time period, delta, between expected time of reception and actual time of reception |
| Completeness | Is sensor data received from "all" slave sensors in the area? | No. of slave sensors expected to transmit vs. No. of slave sensors actually transmitting |
| Correctness | Is sensor data received correct? | Is the sensor data received within a range of expected set of values? Is the No. of outliers in the sensor data excessive? |
| Uniqueness | Is sensor data non-redundant? | In many resource-constrained application domains, there can be cases where redundant sensor data is received, in which slave sensors are transmitting data at unnecessarily short intervals or transmitting data from the same geographical location. |
| Longevity | How long time is the sensor data received? | Time span during which a data stream has been delivering sensor data. |

Calculation of data quality is typically done every time a new data packet is received from a single-purpose slave worker and may rely on the formula below.

Let $C = \{c_1, c_2, \ldots, c_n\}$ be a set of normalized values in [0, 1]. These values correspond to calculations of data quality using individual data quality criteria, for example the ones as illustrated in Table 1 above. The greater the value of a $c_i$ within C is, the greater the data quality for the criterion i.

For every $c_i$ within C there may also exist a weight coefficient $w_i$, covering the importance of each individual data quality criterion in the overall data quality calculation. The smaller the value of weight coefficient $w_i$, the lesser the importance of the criterion i.

The data quality for a given data packet P is therefore a normalized value between 0 and 1, and may be given by the following equation:

$$\text{Data quality} = (w_1 c_1 + w_2 c_2 + \ldots + w_n c_n)/n$$

The calculated data quality may then be compared against a predefined data quality threshold in order for the master sensor to determine whether the data quality exceeds the data threshold or not, and further to determine a reliability metric of the single-purpose slave sensor, as mentioned above.

In 306, for each single-purpose slave sensor from which sensor data is received, it can thus be determined whether the data quality of each sensor data exceeds a data quality threshold.

If it is determined in 306, that the data quality of the sensor data exceeds a data quality threshold, the master sensor may perform sending 308 a message accepting the sensor data to each respective single-purpose slave sensor.

In 310, the master sensor then performs updating a reliability of the respective single-purpose slave sensors. As mentioned above, having determined that the data quality exceeds a data quality threshold, the reliability for the particular single-purpose slave sensor may either be improved or confirmed to be substantive.

In 312, the master sensor may perform processing of the received sensor data, after which may forward the processed sensor data to a network node, in step 314. At least a representation of the sensor data having a data quality exceeding a data quality threshold, is typically forwarded. This representation may comprise the data sensor itself or a processed or filtered version thereof.

If it is determined in 306, that the data quality of the sensor data is lower than the data quality threshold, the master sensor performs updating a reliability of the respective single-purpose slave sensors, in 316.

As previously mentioned a reliability metric of each single-purpose slave sensor can be calculated by taken into account historical data quality. If a single-purpose slave sensor has transmitted sensor data having a quality being lower than a data quality threshold, and this repeatedly occurs said single-purpose slave sensor is deemed to be unreliable, and the master sensor may send a termination message to said single-purpose slave sensor to cease the functioning or the process within the single-purpose slave sensor.

The duration between updated reliability metrics or readings as well as the age and number of those metrics or readings may be determining factors for terminating or deactivating a single-purpose slave sensor.

Actual values on these parameters depend on the application domain and may be configured on the master sensors prior to their deployment. This configuration may be performed in a way similar to the configuration of the example data quality criteria as described above.

In 318, the master sensor determines for each single-purpose slave sensor whether the updated reliability of the single-purpose slave sensor specifies that it is reliable.

In 320, the master sensor sends a message denying sensor data received from single-purpose slave sensors, if these single-purpose slave sensors were determined to be reliable in 318.

In 322, the master sensor sends a message initiating termination of the respective single-purpose slave sensor, to each single-purpose slave sensor which has been determined to be unreliable.

Figure 4:
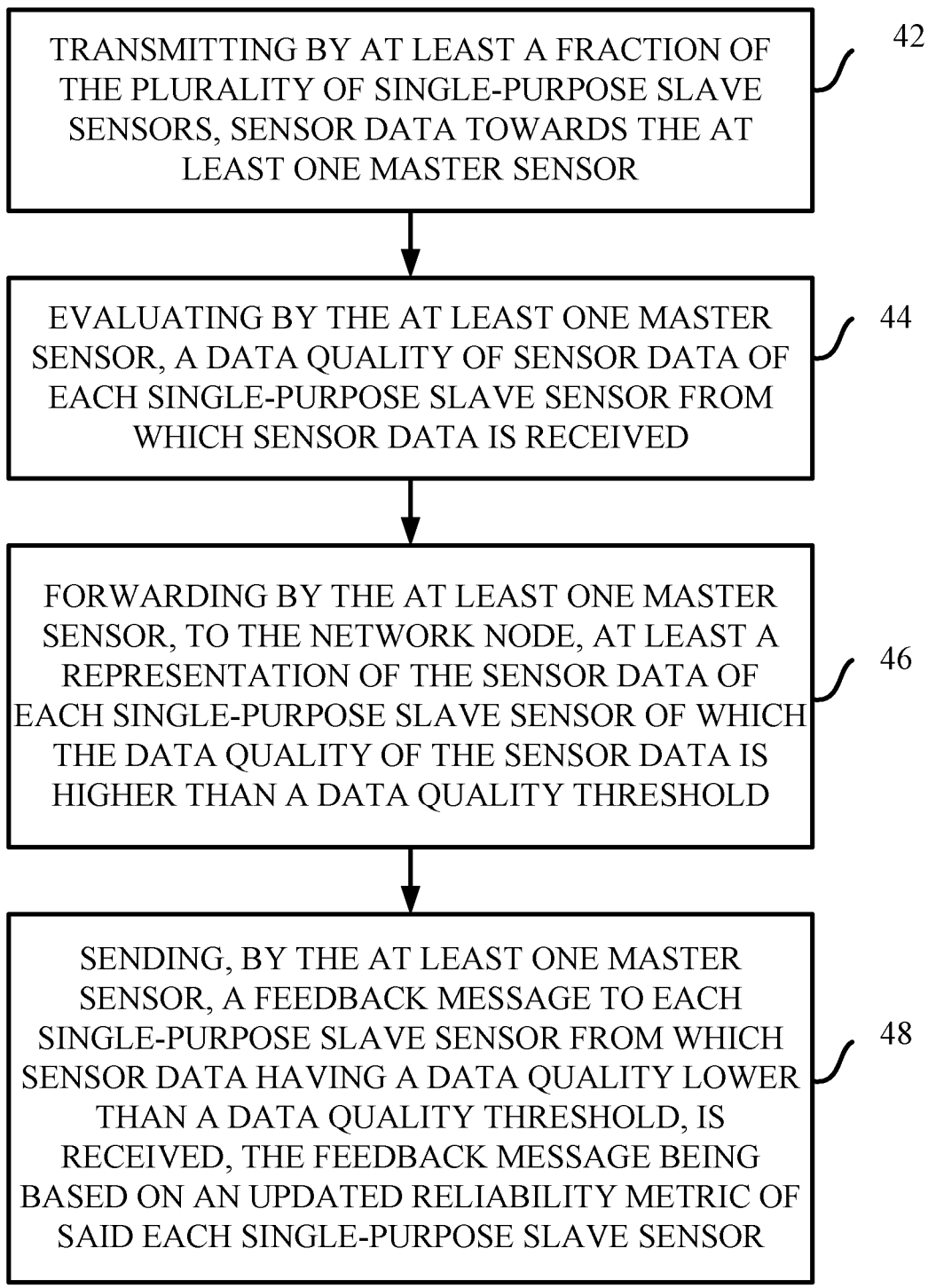

FIG. 4 presents another flowchart of steps in a method in a sensor system for providing quality data to a network node, according to embodiments of the present disclosure. The flowchart comprises transmitting 42 by at least a fraction of a plurality of single-purpose slave sensors, sensor data towards at least one master sensor. The flowchart also comprises evaluating 44 by the at least one master sensor, a data quality of sensor data of each single-purpose slave sensor from which sensor data is received. The flowchart further comprises forwarding 46 by the at least one master sensor to the network node at least a representation of the sensor data of each single-purpose slave sensor of which the data quality of the sensor data is higher than a data quality threshold. In addition, the flow-chart also comprises sending 48 by the at least one master sensor, a feedback message to each single-purpose slave sensor from which sensor data having a data quality lower than a data quality threshold is received, the feedback message being based on an updated reliability metric of said each single-purpose slave sensor.

Sending the feedback message may comprise sending, to single-purpose slave sensors having an updated reliability metric specifying that they are reliable, a message denying the received sensor data from said single-purpose slave sensors.

Sending the feedback message may comprise sending, to single-purpose slave sensors having an updated reliability metric specifying that they are unreliable, a message initiating termination of said single-purpose slave sensors.

Evaluating the data quality of sensor data may comprise evaluating whether the sensor data received fulfils a quality criterion of one or more of: timeliness, completeness, correctness, uniqueness and longevity of said sensor data received.

The method for providing quality data may further comprise processing or filtering the sensor data having a data quality higher than the data quality threshold, yielding the representation of said sensor data.

Transmitting the sensor data towards the at least one master sensor, may comprise broadcasting by the at least a fraction of the plurality of single-purpose slave sensors, said sensor data.

Transmitting the sensor data towards the at least one master sensor, may comprise unicasting by the at least a fraction of the plurality of single-purpose slave sensors, said sensor data.

The method for providing quality data may further comprise maintaining, by the at least one master sensor, an overall data quality metric for the plurality of single-purpose slave sensors within its population, wherein the data quality metric is related to the number of single-purpose slave sensors to which the message initiating termination has been sent.

Maintaining said overall data quality metric may comprise maintaining the number of single-purpose slave sensors transmitting sensor data divided by the number of single-purpose slave sensors to which the message initiating termination has been sent.

The method for providing quality data may further comprise sending, by the at least one master sensor, the overall data quality metric within its population, to another master sensor, and receiving an overall data quality metric of another population of single-purpose slave sensors of said another master sensor.

The method for providing quality data may further comprise sending by the at least one master sensor, a message to all single-purpose slave sensors within a population, initiating termination of transmitting single-purpose slave sensors within the population, if said overall data quality metric within said population falls below an overall data quality metric threshold.

It is noted that the method may further comprise maintaining or storing, by each master sensor, the number of deactivated or terminated single-purpose slave sensor as well as the number of single-purpose slave sensors actively transmitting their sensor data, at regular intervals. These numbers may be used to by master sensors when monitoring or determining the status of the sensor system.

Independently of the evaluation of the data quality of the received sensor data and the forwarding process of quality sensor data, master sensors may be configured to periodically communicate with each other to monitor the overall data quality of the sensor system.

Each master sensor may therefore be configured to maintain a ratio between the number of actively transmitting single-purpose slave sensors divided by the number of terminated or deactivated single-purpose slave sensors of a population of sensors.

Each master sensor may hence be configured to communicate this ratio to the other neighboring master sensors. In this way, at any given time of network operation, each master sensor may be aware of the total ratio of active and transmitting (or "good") single-purpose slave sensors versus terminated or deactivated (or "bad") single-purpose slave sensors in the sensor system.

If this ratio is close to zero, i.e. the number of active and transmitting single-purpose slave sensors is much less than the number of deactivated or terminated single-purpose slave sensors, then the master sensor may take the decision to shut down the entire sensor system. Each master sensor is configured to send a notification of network shutdown to the operating authority, in this case, and to send a termination message or command to all single-purpose slave sensors in the sensor population, and to shut down itself.

Figure 5:
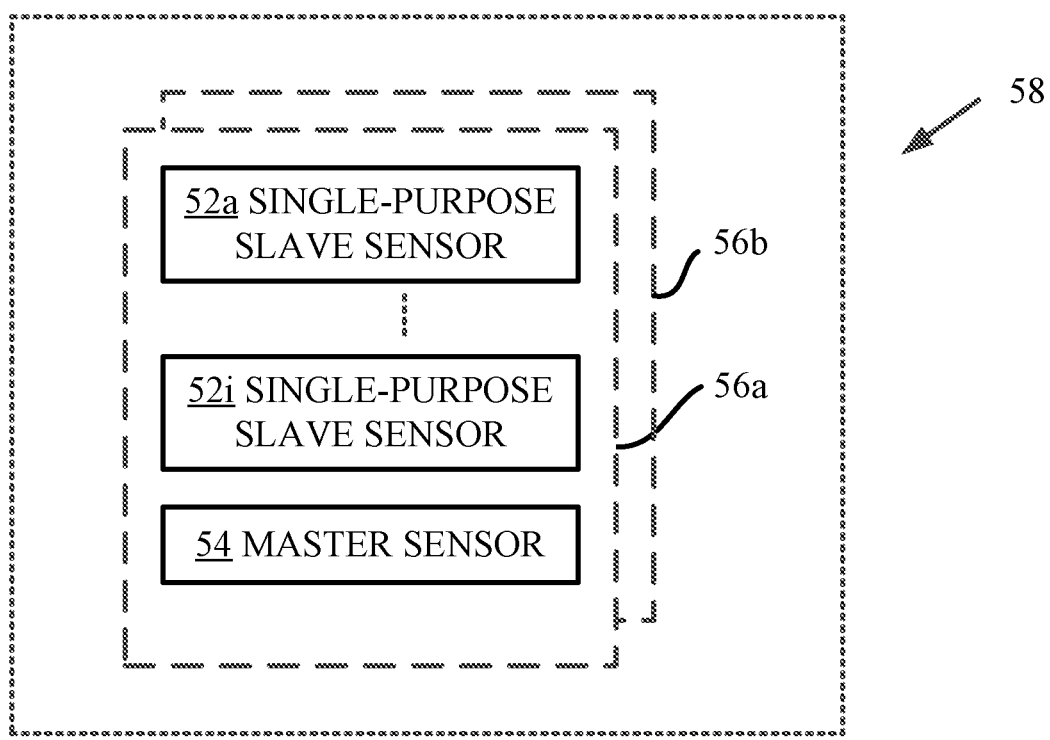
FIG. 5 illustrates schematically an exemplary sensor system.

FIG. 5 schematically presents a sensor system 58 capable of providing quality data to a network node, the sensor system comprising two or more populations 56a, 56b of sensors, where each population comprises:
   a plurality of single-purpose slave sensors 52a, . . . , 52i distributed over a geographical area, and
   at least one master sensor 54,
   wherein at least a fraction of the plurality of single-purpose slave sensors is adapted to transmit sensor data towards the at least one master sensor; and wherein the at least one master sensor is adapted to evaluate a data quality of sensor data of each single-purpose slave sensor from which sensor data is received; to forward to a network node at least a representation of the sensor data of each single-purpose slave sensor of which data quality is higher than a data quality threshold; and to send by the at least one master sensor, a feedback message to each single-purpose slave sensor from which sensor data having a data quality lower than a data quality threshold is received, the feedback message being based on an updated reliability metric of said each single-purpose slave sensor.

The at least a representation of the sensor data of each single-purpose slave sensor, within the sensor system may comprise the sensor data or a processed of filtered version of the sensor data thereof.

The plurality of single-purpose slave sensors of the sensor system may comprise slave sensors being adapted to perform one type of measurement of a group of measurement types comprising humidity, temperature, particle concentration, and rainfall.

The plurality of single-purpose slave sensors of the sensor system may be adapted to transmit their sensor data towards the at least one master sensor via radio communication.

The network node to which at least the representation of the sensor data of each single-purpose slave sensor can be forwarded may be a network destination.

This disclosure has presented a sensor system that is resilient to faults in individual single-purpose slave sensors, as individual single-purpose slave sensors are not integral parts of the sensor system of embodiments of this disclosure. Rather, individual single-purpose slave sensors are merely disposable devices.

In contrast to individual single-purpose slave sensors, this disclosure concerns a plurality of single-purpose slave sensors.

By "plurality" is meant a large number, typically more than 50 or even more than 100.

The plurality of single-purpose slave sensors are in some respects regarded as a single entity. However, for the evaluation of the data quality of the single-purpose slave sensor, each single-purpose slave sensor is typically regarded as singular entity.

When deploying single-purpose slave sensors over a geographical area some sensors may fail due to being out of range in relation to neighbouring slave sensors or he master sensor. However, the the volume of single-purpose slave sensors is considered to compensate for such failures.

Single-purpose slave sensors are typically inexpensive slave sensors which are specialized to measure a single parameter and transmit data reflecting this measured single parameter. Nonexclusive examples of what to measure may be temperature, pressure, humidity, etc.

Embodiments of the sensor system also provides a possibility to deploy master sensors and single-purpose slave sensor networks in remote or inaccessible areas without large network planning expenditures, for example by "carpet-bombing" an area with slave sensors and master sensors from the air.

Another advantage is that maintenance costs/activities within a geographical area of distributed sensors are basically reduced to zero. When entire populations of sensors show too many failures, new sensors can be replenished in bulk.

Since the deployment and maintenance are inexpensive, scalability and deployment over large geographical areas such as farmlands, forests, seas, lakes, clouds, etc is enabled.

It is to be understood that the choice of interacting units or modules, as well as the naming of the units are only for exemplary purpose, and may be configured in a plurality of alternative ways in order to be able to execute the disclosed process actions. Further, the units or modules may be regarded as logical entities and not with necessity as separate physical entities. It will be appreciated that the scope of the technology disclosed herein fully encompasses other embodiments which may become obvious to those skilled in the art, and that the scope of this disclosure is accordingly not to be limited.

A reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed hereby. Moreover, it is not necessary for a device or method to address each and every problem sought to be solved by the technology disclosed herein, for it to be encompassed hereby.

In the preceding description, for purposes of explanation and not limitation, specific details are set forth such as particular architectures, interfaces, techniques, etc. in order to provide a thorough understanding of the disclosed technology. However, it will be apparent to those skilled in the art that the disclosed technology may be practiced in other embodiments and/or combinations of embodiments that depart from these specific details. That is, those skilled in the art will be able to devise various arrangements which, although not explicitly described or shown herein, embody the principles of the disclosed technology. In some instances, detailed descriptions of well-known devices, circuits, and methods are omitted so as not to obscure the description of the disclosed technology with unnecessary detail. All statements herein reciting principles, aspects, and embodiments of the disclosed technology, as well as specific examples thereof, are intended to encompass both structural and functional equivalents thereof. Additionally, it is intended that such equivalents include both currently known equivalents as well as equivalents developed in the future, e.g. any elements developed that perform the same function, regardless of structure.

Thus, for example, it will be appreciated by those skilled in the art that the figures herein can represent conceptual views of illustrative circuitry or other functional units embodying the principles of the technology, and/or various processes which may be substantially represented in computer readable medium and executed by a computer or processor, even though such computer or processor may not be explicitly shown in the figures.

The functions of the various elements including functional blocks may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented.

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible.

The invention claimed is:

1. A method for providing quality data to a network node, the method comprising:
   a first master sensor receiving first sensor data transmitted by a first single-purpose slave sensor;
   the first master sensor receiving second sensor data transmitted by a second single-purpose slave sensor;
   evaluating, by the first master sensor, a data quality of the first sensor data to determine whether the evaluated data quality of the first sensor data is higher than a data quality threshold;

evaluating, by the first master sensor, a data quality of the second sensor data to determine whether the evaluated data quality of the second sensor data is higher than the data quality threshold;

forwarding, by the first master sensor, to the network node at least a representation of the first sensor data, wherein the evaluated data quality of the first sensor data is higher than the data quality threshold;

after the data quality of the second sensor data is evaluated, updating a current reliability metric for the second single-purpose slave sensor, thereby producing an updated reliability metric for the second single-purpose sensor; and the first master sensor sending to the second single-purpose slave sensor a feedback message based on the updated reliability metric for the second single-purpose slave sensor, wherein the evaluated data quality of the second sensor data is lower than the data quality threshold, wherein updating the current reliability metric for the second single-purpose slave sensor comprises retrieving the current reliability metric for the second single-purpose slave sensor and then using the retrieved current reliability metric to calculate the updated reliability metric, evaluating the data quality of the first sensor data to determine whether the evaluated data quality of the first sensor data is higher than the data quality threshold comprises: i) obtaining information about the first sensor data; ii) calculating a data quality metric for the first sensor data based on the obtained information about the first sensor data; and iii) comparing the calculated data quality metric to the data quality threshold, and calculating the data quality metric (DOM) for the first sensor data based on the obtained information about the first sensor data comprises calculating: DOM=$((w1 \times c1)+(w2 \times c2))$, wherein w1 is a first weight value, w2 is a second weight value, c1 is a first value determined based on the obtained information about the first sensor data, and c2 is a second value determined based on the obtained information about the first sensor data.

2. The method according to claim 1, wherein sending the feedback message based on the updated reliability metric comprises:
determining whether the updated reliability metric for the second single-purpose slave sensor satisfies a condition indicating that the second single purpose sensor is regarded as reliable,
as a result of determining that the updated reliability metric for the second single-purpose slave sensor satisfies the condition indicating that the second single purpose sensor is regarded as reliable, generating the feedback message such that the feedback message indicates that the second sensor data has been denied, and
sending to the second single-purpose slave sensor the feedback message indicating that the second sensor data has been denied.

3. The method according to claim 1, wherein sending the feedback message based on the updated reliability metric comprises:
determining whether the updated reliability metric for the second single-purpose slave sensor satisfies a condition indicating that the second single purpose sensor is regarded as unreliable,
as a result of determining that the updated reliability metric for the second single-purpose slave sensor satisfies the condition indicating that the second single purpose sensor is regarded as unreliable, generating the feedback message such that the feedback message instructs the second single-purpose sensor to initiate a termination of the second single-purpose sensor, and
sending to the second single-purpose slave sensor the feedback message instructing the second single-purpose sensor to initiate the termination of the second single-purpose sensor.

4. The method according to claim 1, wherein evaluating the data quality of the first sensor data comprises evaluating whether the first sensor data received fulfils a quality criterion of one or more of: redundancy, completeness, correctness, uniqueness, and longevity.

5. The method according to claim 1, further comprising processing or filtering the first sensor data having a data quality higher than the data quality threshold, yielding the representation of said sensor data.

6. The method according to claim 1, wherein the first sensor data is broadcast by the first single-purpose slave sensor.

7. The method according to claim 1, wherein the first sensor data is unicast by the first single-purpose slave sensor.

8. The method according to claim 3, further comprising maintaining, by the first master sensor, an overall data quality metric for a plurality of single-purpose slave sensors within a first group of sensors, wherein the data quality metric is related to a number of single-purpose slave sensors to which a message initiating termination has been sent.

9. The method according to claim 8, wherein maintaining the overall data quality metric comprises maintaining the number of single-purpose slave sensors transmitting sensor data divided by the number of single-purpose slave sensors to which the message initiating termination has been sent.

10. The method according to claim 8, further comprising sending, by the first master sensor, the overall data quality metric, to a second master sensor, and receiving an overall data quality metric of a second group of single-purpose slave sensors of said second master sensor.

11. The method according to claim 10, further comprising sending, by the first master sensor, a message to all single-purpose slave sensors within a population, initiating termination of transmitting single-purpose slave sensors within the population, if the overall data quality metric within said population falls below an overall data quality metric threshold.

12. A master sensor for providing quality data to a network node, wherein the master sensor is adapted to:
obtain first sensor data transmitted by the first single-purpose slave sensor;
obtain second sensor data transmitted by the second single-purpose slave sensor;
evaluate a data quality of the first sensor data to determine whether the evaluated data quality of the first sensor data is higher than a data quality threshold;
evaluate a data quality of the second sensor data to determine whether the evaluated data quality of the second sensor data is higher than the data quality threshold;
after the data quality of the second sensor data is evaluated, update a current reliability metric for the second single-purpose slave sensor, thereby producing an updated reliability metric for the second single-purpose sensor; and
when the evaluated data quality of the second sensor data is lower than the data quality threshold, send to the second single-purpose slave sensor a feedback message based on the updated reliability metric for the second single-purpose slave sensor, wherein the master sensor is configured to update the current reliability metric for the second single-purpose slave sensor comprises by retrieving the current reliability metric for the second single-purpose slave sensor and then using the retrieved current reliability metric to calculate the updated reliability metric, the master sensor is configured to evaluate the data quality of the first sensor data to determine whether the evaluated data quality of the first sensor data is higher than the data quality threshold by performing actions that include: i) obtaining information about the first sensor data; ii) calculating a data quality metric for the first sensor data based on the obtained information about the first sensor data; and iii) comparing the calculated data quality metric to the data quality threshold, and the master sensor is configured to calculate the data quality metric (DOM) for the first sensor data based on the obtained information about the first sensor data by calculating: $DOM=((w1 \times c1)+(w2 \times c2))$, wherein w1 is a first weight value, w2 is a second weight value, c1 is a first value determined based on the obtained information about the first sensor data, and c2 is a second value determined based on the obtained information about the first sensor data.

13. The master sensor according to claim 12, wherein the master is further adapted such that, as a result of determining that the evaluated data quality of the first sensor data is higher than a data quality threshold, the master sensor forwards to the network node a representation of the first sensor data, wherein the representation of the first sensor data comprises at least the first sensor data or a processed version of the first sensor data.

14. The method of claim 1, wherein the information about the first sensor data comprises information indicating a time difference between a time at which the first sensor data was received by the first master sensor and an expected time of reception.

15. The method of claim 1, wherein the first sensor data comprises a sensor value, and the information about the first sensor data comprises: information indicating whether the sensor value data falls within an expected range of values and/or information indicating whether the sensor value is redundant.

16. The method of claim 1, wherein updating the current reliability metric for the second single-purpose slave sensor comprises setting the current reliability metric for the second single-purpose slave sensor to a predetermined value.

* * * * *